United States Patent [19]

Krishnakumar et al.

[11] Patent Number: 5,101,990

[45] Date of Patent: Apr. 7, 1992

[54] STRETCH BLOW MOLDED OBLONG OR OVAL CONTAINER

[75] Inventors: Suppayan M. Krishnakumar, Nashua; Wayne N. Collette, Merrimack, both of N.H.

[73] Assignee: Continental PET Technologies, Inc., Florence, Ky.

[21] Appl. No.: 497,701

[22] Filed: Mar. 23, 1990

[51] Int. Cl.⁵ .......................... B65D 1/02; B65D 1/40
[52] U.S. Cl. ...................................... 215/1 C; 220/675
[58] Field of Search ...................... 215/1 C; 220/675; 264/521, 532

[56] References Cited

U.S. PATENT DOCUMENTS

| | | | |
|---|---|---|---|
| 3,137,748 | 6/1964 | Makowski | 215/1 C X |
| 3,632,713 | 1/1972 | Seefluth | 264/520 |
| 3,662,048 | 5/1972 | Turner | 264/520 X |
| 3,989,784 | 11/1976 | Uhlig | 264/520 |
| 4,024,975 | 5/1977 | Uhlig | 215/1 C |
| 4,254,079 | 3/1981 | Agrawal | 264/532 X |
| 4,254,080 | 3/1981 | Agrawal | 264/532 X |
| 4,380,526 | 4/1983 | Agrawal | 264/532 X |
| 4,785,948 | 11/1988 | Strassheimer | 220/675 X |
| 4,885,197 | 12/1989 | Strassheimer | 220/675 |
| 5,002,718 | 3/1991 | Tanaka et al. | 264/532 X |

*Primary Examiner*—Sue A. Weaver
*Attorney, Agent, or Firm*—Charles E. Brown

[57] ABSTRACT

This relates to the stretch blow molding of containers having bodies of oblong or oval cross section starting with an injection molded plastic preform. First there is the discovery that the preform does not axially stretch evenly as occurs with circular or generally circular cross sectional container bodies but includes a lesser stretching at the center of sides of such container bodies. Having made this discovery, it is proposed to provide such containers with oval or oblong cross sectional bodies with radially inwardly directed ribs wherein the ribs conform to the differential in axial stretching of the material of the preform.

13 Claims, 2 Drawing Sheets

U.S. Patent    Apr. 7, 1992    Sheet 1 of 2    5,101,990
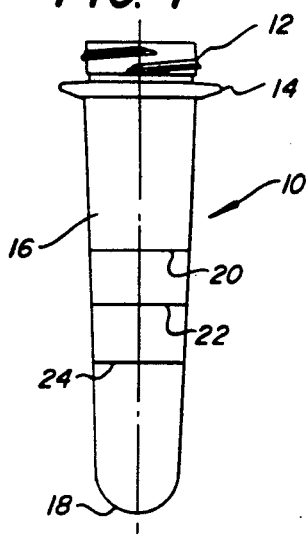
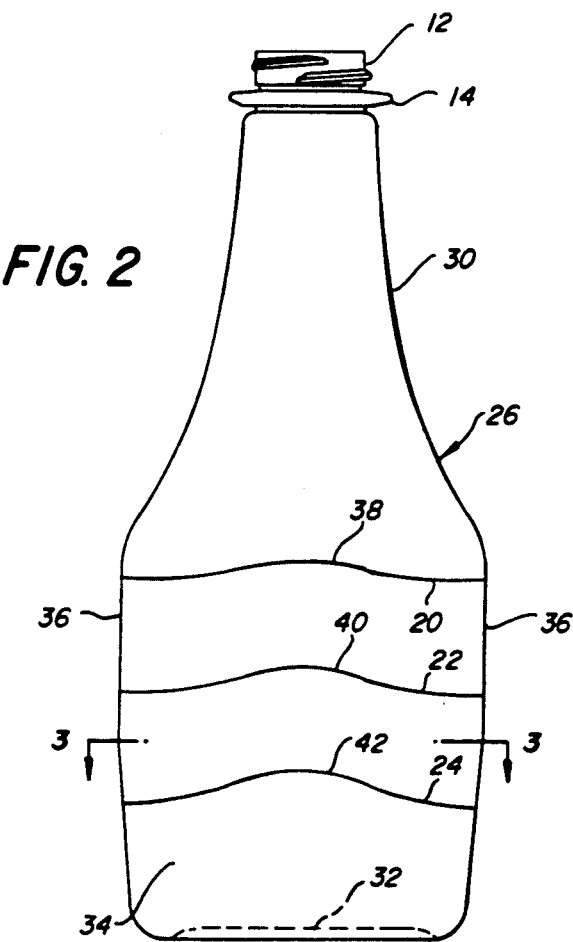
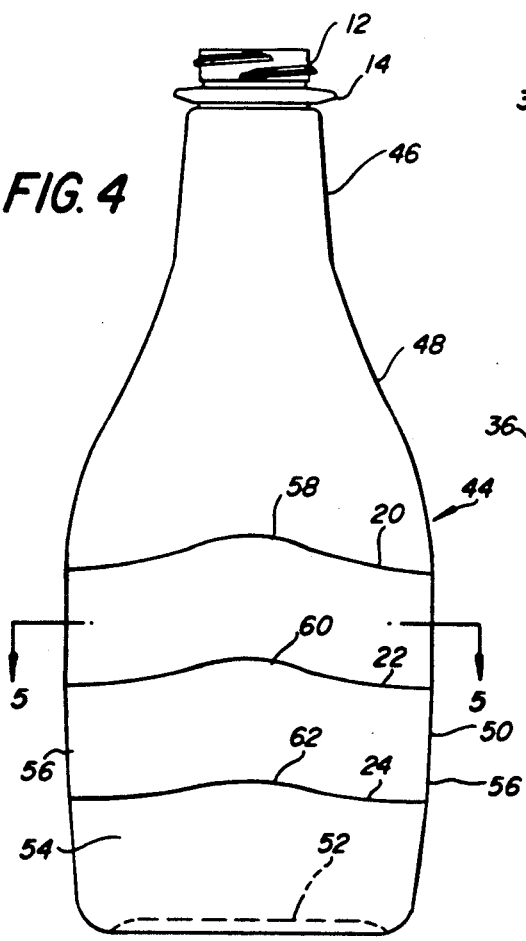
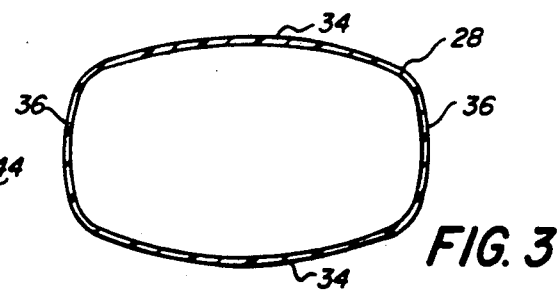
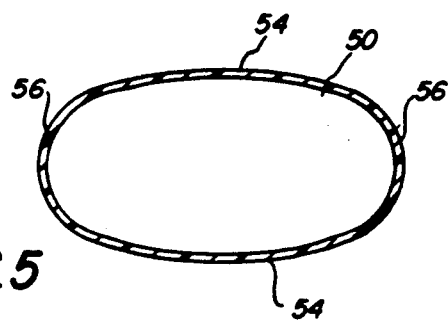

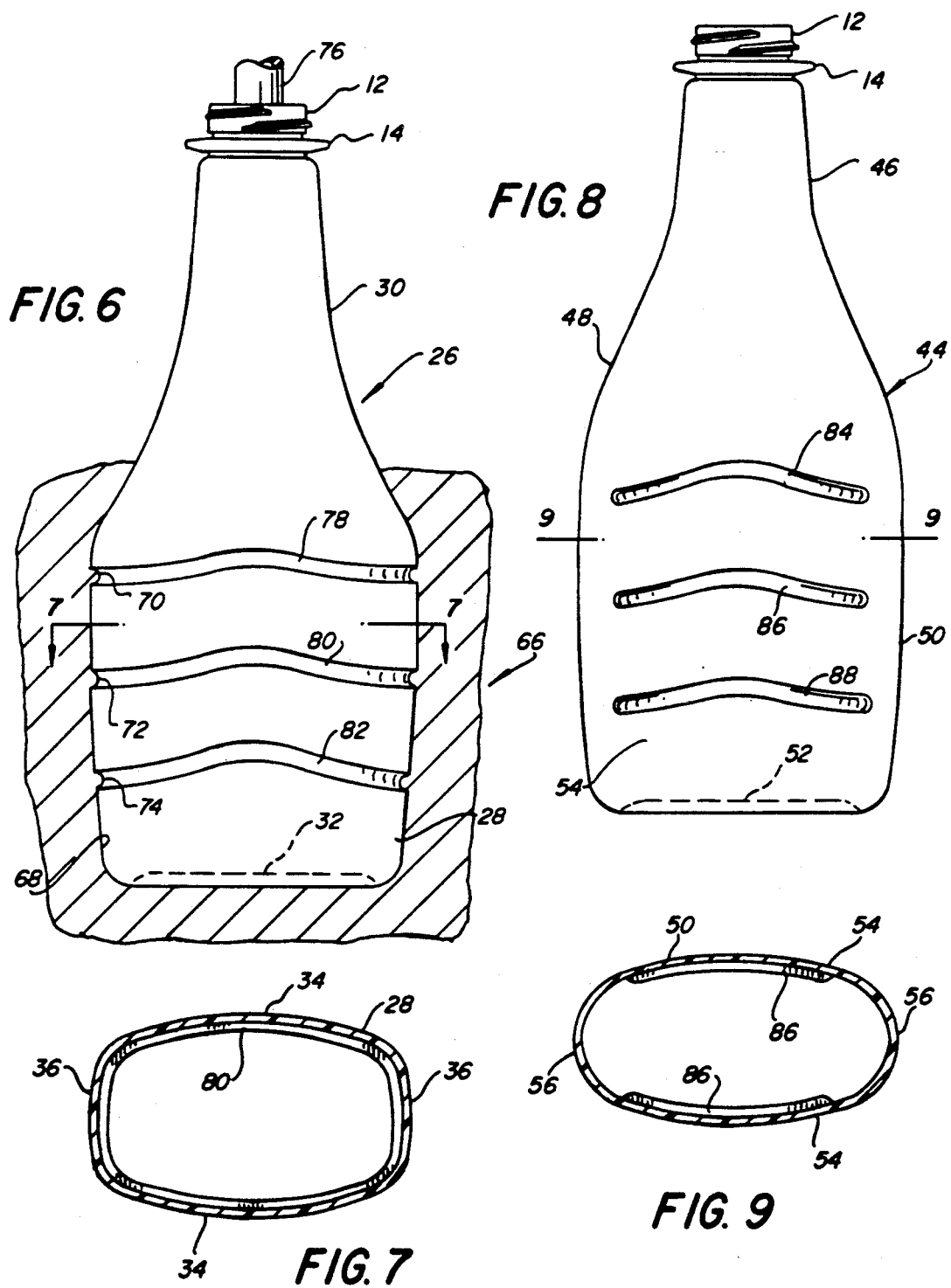

STRETCH BLOW MOLDED OBLONG OR OVAL CONTAINER

This invention in particular relates to a stretch blow molded container which is formed from an injection molded preform and wherein the container instead of having a body of a circular or generally circular configuration, has a body which is selectively oblong or oval.

It is well known to blow mold containers, particularly bottles, having bodies which in transverse cross section are oblong or oval. However, these bottles are formed from parisons which have the same starting length as the resultant bottle and are stretched only in the hoop direction. Such bottles are not biaxially oriented and do not have the desired strength.

Stretch blow molded containers are formed from injection molding preforms wherein the neck finish of the container is formed at the time of the injection molding of the preform and only that part of the preform positioned below the capping flange thereof are stretched. It has been found that while stretch blow molded containers having circular or generally circular cross sectional bodies stretch equally about its circumference, when the container has the body of a generally rectangular cross section, i.e. containers having bodies of an oblong or oval cross section, there is a differential in the axial stretching of the material of the preform particularly in the wide sides as opposed to the narrow ends of such containers. It has been found that the material of the preform forming the ends stretch a maximum and that the material of the preforms forming container sides stretch a minimum at the centers of such sides.

Further, in accordance with this discovery, it has been found that if the containers are to be provided with reinforcing ribs in the bodies extending transversely of the sides, the ribs cannot be straight line ribs lying in a plane, but must be curved ribs having upwardly arched central portions so that there will be no differential stressing within the ribs.

Because the blow mold for forming a container having a body with an oblong or oval cross section are oriented within an associated blow mold, it is feasible to provide the blow mold with radially inwardly directed ribs which results in the formation of radially inwardly directed ribs in the body of the container. Further, because the preform is stretched by way of a stretch rod, the preform is fully axially stretched before it is fully stretched in the hoop direction. Thus, the axial stretching of the preform is complete at the time the preform is expanded to match the walls of the blow mold cavity. This permits the provision of ribs on the blow mold projecting radially into the blow mold cavity with the ribs being of a controlled depth which permits separation of the stretch blow molded container from a split blow mold.

With the above and other objects in view that will hereinafter appear, the nature of the invention will be more clearly understood by reference to the following detailed description, the appended claims, and the several views illustrated in the accompanying drawings.

FIG. 1 is an elevational view of an injection molded preform which has fine lines scribed thereon, the lines lying in transverse planes normal to the axis of the preform.

FIG. 2 is an elevational view of a container which is oblong in cross section in the body thereof and shows the lines which were placed on the parison as being upwardly arched at the centers of sides of the container.

FIG. 3 is a transverse sectional view taken generally along line 3—3 of FIG. 2 and shows the oblong cross section of the body of the container of FIG. 2.

FIG. 4 is an elevational view of a slightly different cross sectional container, an oval cross section, stretch blow molded from the preform of FIG. 1 and shows the arching of the scribed lines in accordance with the differential stretching of that portion of the preform which forms a side of the container.

FIG. 5 is a transverse horizontal sectional view taken generally along the line 5—5 of FIG. 4 and shows the oval cross section of the container body.

FIG. 6 shows the blow molding of a container similar to the container of FIG. 2 in a split blow mold wherein the blow mold is provided with radially inwardly projecting ribs of a contour in accordance with the differential stretching of the sides and ends of the container FIG. 7 is a transverse horizontal sectional view taken through the container of FIG. 6 and shows the specific oblong cross section thereof.

FIG. 8 is an elevational view of a container similar to that of FIG. 4 but wherein radially inwardly directed ribs are formed in the sides only thereof.

FIG. 9 is a horizontal transverse sectional view taken generally along the line 9—9 of FIG. 8 and shows the oval cross section of the container of FIG. 8.

As stated above, it is well known to blow mold containers having bodies of a generally rectangular cross section and more specifically of an oblong or oval cross section utilizing a parison wherein there is substantially no axial stretching but wherein the stetching is primarily restricted to stretching in the hoop direction. Such containers are not biaxially oriented and do not have the strength of stretch blow molded containers.

Experimental work has now begun with the formation of stretch blow molded containers starting with an injection molded preform wherein the containers have bodies of an oval or oblong cross section. As a result of work in this area, it has been discovered that in the formation of a container by stretch blow molding, the material of the preform does not axially stretch uniformly as does occur in stretch blow molding containers having bodies of a circular or generally circular cross section.

Referring now specifically to the drawings in detail, reference is first made to FIG. 1 wherein there is illustrated an injection molded preform of a conventional type and generally identified by the numeral 10. The preform 10 is provided with an injection molded neck finish 12 and below the neck finish there is an injection molded capping flange 14. Below the capping flange 14, there is an elongated, slightly tapered hollow body 16 which terminates in a generally hemispherical closed bottom 18. In accordance with this discovery, at axially spaced intervals there is provided on that part of the preform body 16 which will form a body of a resultant stretch blow molded container lines 20, 22 and 24. These lines are disposed in planes normal to a longitudinal axis of the preform 10.

The preform 10 is stretch blow molded in a conventional manner in a blow mold having a cavity to form a container generally identified by the numeral 26 which is provided with a body 28 of an oblong cross section as is shown in FIG. 3. In the formation of the container 26, the neck finish 12 and the capping flange 14 remain unchanged. An upper part of the preform body 16 forms an elongated tapered shoulder 30 which opens into the container body 28. The lower end of the container body 28 is closed by way of a bottom 32 which is slightly recessed as is best shown in dotted lines in FIG. 2.

It also is to be noted that with the oblong cross section of the body 28, the body 28 is provided with relatively wide sides 34 and relatively narrow ends 36.

Further, from FIG. 2, it will be seen that the line 20, as it passes around the ends 36, is generally planar while the line 20 in the central portion of each side 34 arches upwardly as at 38.

Next, it will be seen that the line 22 is also generally planar around the ends 36, but is arched upwardly in the center of the sides 34 as at 40. Also, it will be seen that the upward arching 40 is greater than the upward arching 38.

Next, with respect to the line 24, it will be seen that it is generally planar around the ends 36, but is provided with an upwardly arched central portion 42 along the centers of the sides 34. In addition, the arching 42 is greater than the arching 40 and 38 with the arching of the lines increasing as they approach the bottom 32.

Next, it is to be noted that the upward arching is curved and then as the lines 20, 22 and 24 approach the ends 36, the lines are reversely curved to provide a smooth transition between the curved portions of the lines and the planar portions of the lines in the ends 36.

Next, reference is made to FIGS. 4 and 5 wherein there is illustrated a stretch blow molded container, generally identified by the numeral 44, and differing from the container 26 in that it has a body of oval cross section as is best shown in FIG. 5. The container 44 is blow molded from a preform similar to the preform 10 of FIG. 1 but of a different geometry including having an upper configuration which is slightly different from that of the container 26.

The container 44 includes a neck finish 12 and a capping flange 14 which remain unchanged from that of the preform 10. The container 44 neck includes a generally tubular top portion 46 which flares outwardly to form a shoulder 48. The shoulder 48 terminates in the oval cross sectional body 50. The container 44 terminates in a closed bottom which is slightly recessed as is shown in FIG. 4 and identified by the numeral 52.

For identification purposes, the oval cross sectional body 50 is described as having two sides 54 joined by two ends 56 all of which are arcuate in cross section.

Referring once again to FIG. 4, it will be seen that the lines 20, 22 and 24 have a slightly different configuration from the same lines on the stretch blow molded container 26. The line 20 has generally planar portions on the ends 56 while the line 20 on the sides 54 include an upwardly arched central portion 58. In a like manner, the line 22 has generally planar portions on the ends 56 or includes upwardly arched central portions 60 on the sides 54.

In a like manner, the line 24 has generally planar end portions on the ends 56 while it includes an upwardly arched central portion 62 on each of the sides 54.

It is to be noted that as each of the lines 20, 22 and 24 approaches the ends 56, the lines reverse in curvature. Also, it is to be noted that the stretching of the preform appears greatest at the top of the body 50 which is just the opposite of that with respect to the body 28 of the container 26. This variation in stretching is attributed to variations in preform geometry as as opposed to variations in container configuration.

Reference is now made to FIGS. 6 and 7 wherein there is illustrated the container 26 being blown in a blow mold 66 which is provided with a cavity 68 including radially inwardly projecting ribs 70, 72 and 74. It is to be understood that the preform 10 is mounted in the top of the cavity 68 and is supported by the capping flange 14. A stretch rod 76 is then positioned in the preform and is engaged with the bottom 18 thereof. As air is directed into the preform to expand the same, the stretch rod 76 is moved downwardly so that the preform is axially stretched to its completion before the preform is fully expanded in the hoop direction. This generally positions the material of the preform relative to the ribs 70, 72 and 74 before the material of the preform touches such ribs.

The ribs 70, 72 and 74 thus form in the body 28 of the container 26 complimentary radially inwardly directed ribs 78, 80 and 82, respectively. These ribs are centered on the lines 20, 22 and 24 as shown in FIG. 2.

A typical rib 80 is best shown in FIG. 7 with the understanding that the radial extent of each of the ribs 78, 80 and 82 will be such that it may be readily stripped from the blow mold 66 once the blow mold has been opened.

Reference is now made to FIGS. 8 and 9 wherein there is illustrated the container 44 which has been stretched blow molded within a mold having ribs similar to that of the mold 66 but wherein the ribs are only partial ribs. The net result is that the sides 54 of the body 50 is provided with ribs 84, 86 and 88 having positions aligned with the positions of the lines 20, 22 and 24, respectively as appearing in FIG. 4.

Although the ribs 78, 80 and 82 of the container 26 have been illustrated as extending entirely around the container 26 and ribs 84, 86 and 88 have been illustrated as extending primarily along the sides 54, it is to be understood that the container 26 may be provided with partial ribs and the container 44 could be provided with full ribs.

Although only two preferred embodiments of containers having generally rectangular cross sectional bodies have been specifically illustrated and described herein, it is to be understood that minor variations may be made in the container configurations and the method of forming such containers with radially inwardly molded ribs without departing from the spirit and scope of the invention as defined by the appended claims.

We claim:

1. A stretch blow molded plastic container comprising an open top, a closed bottom and a tubular body, said tubular body being of an oval or oblong cross section and including wide sides and narrow ends, said body being axially elongated and stretched in a hoop direction, and the axial elongation of said body being a minimum in central portions of said sides and a maximum in said ends, and planar transverse lines formed on a preform of said container appear as upwardly arched lines on said sides.

2. A plastic container according to claim 1 wherein remote portions of said lines reversely curve towards said ends.

3. A plastic container according to claim 1 wherein said container has radially inwardly directed ribs molded into at least one of said sides with said ribs defining said lines and being arched in accordance with the upwardly arching of said lines.

4. A plastic container according to claim 3 wherein said ribs extend only across said sides.

5. A plastic container according to claim 3 wherein said ribs extend entirely around said container.

6. A plastic container according to claim 3 wherein said container has an injection molded neck finish.

7. A stretch blow molded plastic container comprising an open top, a closed bottom and a tubular body, said tubular body being of an oval or oblong cross section and including wide sides and narrow ends, said body being axially elongated and stretched in a hoop direction, and the axial elongation of said body being a minimum in central portions of said sides and a maximum in said ends, said container having a radially inwardly directed rib molded into at least one of said sides with said rib being arched upwardly.

8. A plastic container according to claim 7 wherein said rib extends only across said sides.

9. A plastic container according to claim 7 wherein said rib extends entirely around said container.

10. A plastic container according to claim 7 wherein said container has an injection molded neck finish.

11. A plastic container according to claim 7 wherein there are a plurality of said ribs spaced axially from one another, and wherein the extent of said upwardly arching varies in said ribs.

12. A plastic container according to claim 11 wherein said upwardly arching increases towards said bottom.

13. A plastic container according to claim 11 wherein said upwardly arching decreases towards said bottom.

* * * * *